March 19, 1968  N. B. TANOS  3,373,787
ASPARAGUS CUTTER
Filed March 17, 1967

INVENTOR.
NICOLAOS BASIL TANOS

United States Patent Office 3,373,787
Patented Mar. 19, 1968

3,373,787
ASPARAGUS CUTTER
Nicolaos Basil Tanos, 1731 R St. NW.,
Washington, D.C. 20009
Filed Mar. 17, 1967, Ser. No. 623,973
6 Claims. (Cl. 146—81)

ABSTRACT OF THE DISCLOSURE

A machine for separating the edible from the fibrous part of an asparagus stalk by pressing along the stalk a probe for finding or locating the point at which the stalk starts yielding considerably under a predetermined amount of pressure and then severing the stalk at said point.

This invention relates to an apparatus for automatically finding and separating the edible from the fibrous part of the asparagus stalks.

An important problem in the asparagus packing plants is the separation of the fibrous from the edible part of the asparagus stalks. I found that the edible part of a stalk presents less resistance to mechanical forces than the fibrous part thereof. A probing element, e.g. a rolling cylinder of about 5 mm. diameter, is pressed against the stalk with a force of about 1 to 3 kg. (depending on the diameters of the cylinder and of the asparagus), starting from the fibrous end of the stalk. The point at which the surface of the stalk yields considerably, e.g. about 4–8 mm. (depending on the diameter of the stalk), is the starting point of the edible part.

Figure 1:
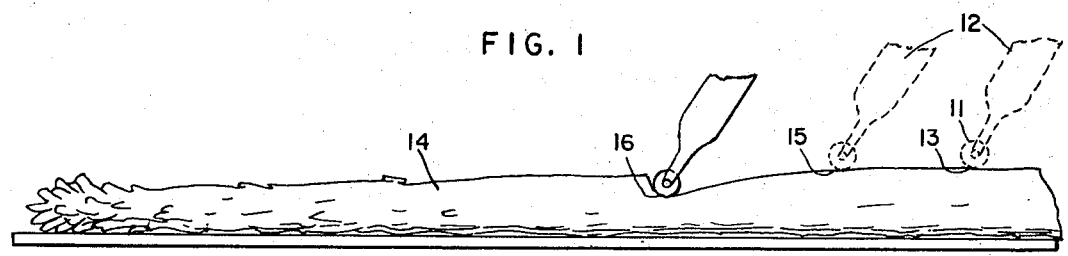
Figure 2:
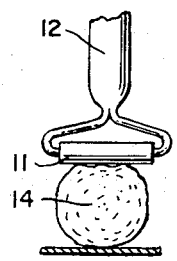
Figure 4:
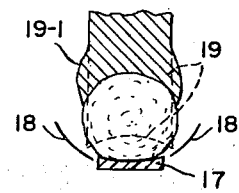
Figure 5:
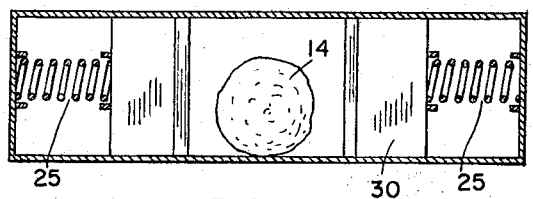
Figure 3:
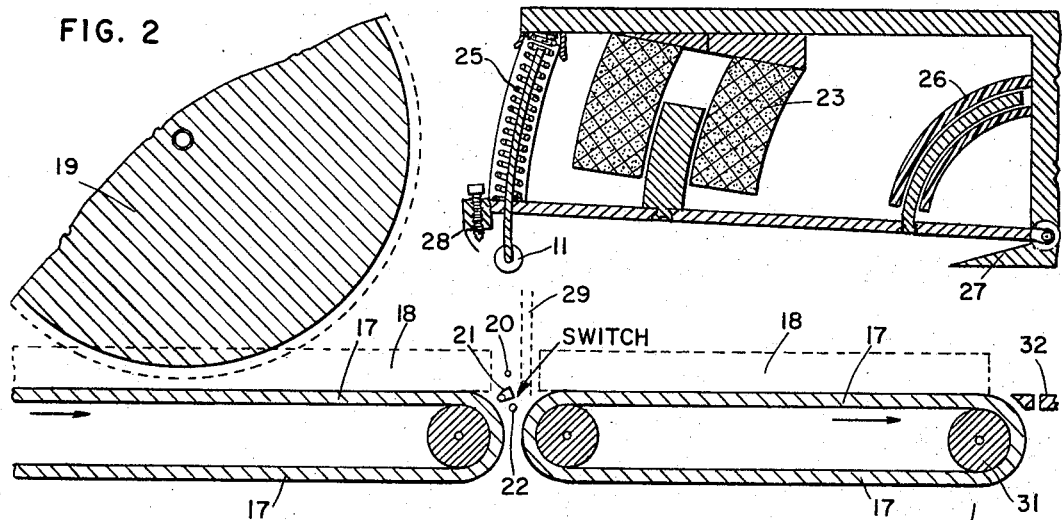
Figures 6, 7:
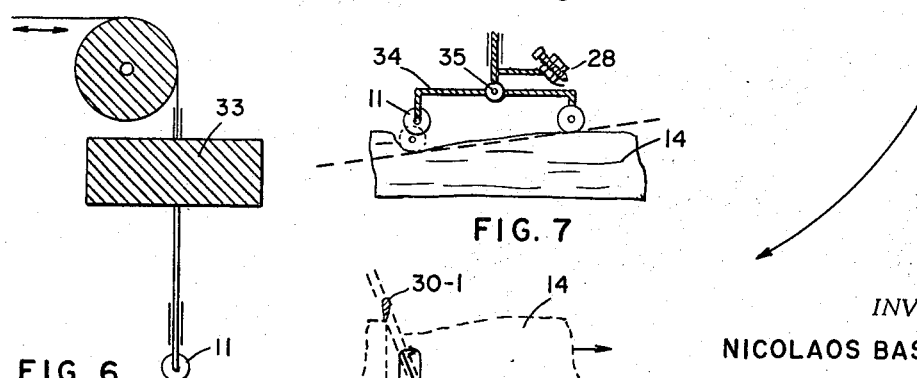
Figure 8:
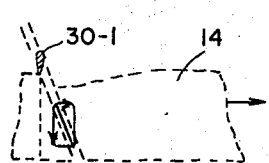

In the drawings, FIG. 1 shows a probing element being pressed against a stalk; FIG. 2 shows a probing element; FIG. 3 shows an apparatus for automatic finding of said point and for cutting the stalks; FIG. 4 shows a cross-section of a stalk held between the conveyor belt (at the left part of FIG. 3) and a soft wheel; FIG. 5 shows a cutting mechanism (in which the two blades can reach simultaneously the axis of the stalk) which may be used in the apparatus of FIG. 3; FIGS. 6 and 7 show two modifications of probing assemblies of the apparatus of FIG. 3; FIG. 8 shows the route of a narrow knife which may be used in a modified cutting mechanism.

More particularly, by pressing the cylinder 11 of the probing element 12 against the fibrous part 13 of the stalk 14, the surface of the stalk remains substantially unchanged. At a location 15, where the fibre starts becoming less, the surface starts yielding, and at a point 16 the stalk yields considerably and may be cut through at this point.

For automatic application of the method the stalk is placed on a narrow belt 17, at the sides of which may be two guard strips 18 which, together with the belt (the upper surface of which may be concave) form a channel in which the stalk travels. The cranked wheel 19 (which may have either a fixed axis and be of very soft rubber—the edges of which are deformed, as e.g. at the points 19–1, when the stalk comes below it—or may be of less soft material and have axis movable up and downwards—driven e.g. photoelectrically—and pushed down e.g. by springs) keeps the stalk firmly on the belt to prevent its displacement during the probing and the cutting thereof. Pairs of side-wheels may keep the stalk at the center of the channel if necessary.

When the forehead of the fibrous part of the stalk, traveling to the right, reaches the area 20 (almost below the probing cylinder), the button 21, which was held at an elevated position by a soft spring, reaches the switch 22 and releases the probing assembly which was held at an elevated position by the electromagnet 23. Said assembly is hinged at 24 and may be pushed downwards by the spring 25 (which naturally presses more on a thick stalk than on a thin one, the surface of the latter being relatively farther away). The motion of the assembly may be delayed somewhat by a shock absorber 26. The switch 22 remains inactive until there is no stalk at area 20. Cylinder 11 may be prevented from going lower than desirable, e.g. by an arm 27. The function of the elements 21 and 22 may be carried out by a photoelectric mechanism controlling the presence of a stalk at area 20.

As the stalk moves to the right the cylinder rolls thereon until the stalk yields considerably to the pressing cylinder and switch 28 touches the surface of the asparagus and causes the electromagnet to raise the probing assembly. The raising may be done without delay. As soon as the probing assembly is out of the channel, a cutting mechanism, the plane of the motion of the knife (or the knives) of which is substantially perpendicular to the plane of the drawing and is located e.g. in the area of the dotted lines 29, cuts through the stalk. To prevent damage of the moving stalk by the knives, the mechanism may move as a whole to the right at the speed of the conveyor belt during the cutting operation, unless the knives move very quickly or the belt is stopped for a while. After cutting the stalk the fibrous part may be thrown down, e.g. by pivotally lowering the wheel 31 considerably, so that only the edible part is led to belt 32 (vertical to the drawing).

A weight 33 may replace the function of spring 25, and a motor the function of the electromagnet. Also, a pair of probing cylinders may be used, e.g. at the ends of a rod 34 (pivoted at 35); when the left cylinder lowers considerably, the switch 28 (which may be adjustable) actuates the electromagnet or the motor. Also, by using a single vertical knife 30–1 moving in a plane sloping in relation to the direction of the motion of belt 17, there is no need to move the cutting mechanism as a whole or to stop the belt. If this knife moves very quickly, said plane may be vertical.

Instead of lowering the wheel 31, strips 18 of the right part of the conveyor belt may push the fibrous part to one of the sides, out of the belt, before the edible part comes into that channel.

What I claim is:

1. An apparatus for finding and removing the fibrous part of an asparagus stalk comprising, conveying means adapted to transport the stalk lengthwise with the fibrous end as forehead, a first sensor being affected from the reaching of said forehead at a certain area, a probe actuated by said first sensor to come into contact with and press the surface of the stalk with the desired pressure when said forehead has reached said area which is near said probe, a second sensor associated with said probe and being affected when said probe reaches a point of the stalk at which the stalk starts yielding considerably owing to the pressure exercised by said probe, means actuated by said second sensor to remove said probe from said stalk when said probe reaches said point, cutting means actuated by said second sensor to cut through the stalk substantially transversely thereto and as near to said point as desirable, and means for discontinuing the affection of said first sensor to the probe after causing it to come into contact with the stalk and until there is no stalk at said area, whereby said fibrous and edible parts may be delivered to separate points after the cutting of the stalk.

2. The apparatus of claim 1 wherein said probe is a rolling cylinder.

3. The apparatus of claim 1 wherein said cutting means comprises a pair of blades adapted to reach simultaneously the axis of the stalk from both sides thereof.

4. The apparatus of claim 1 wherein said cutting means comprises a single blade.

5. The apparatus of claim 1 wherein said cutting means moves as a whole toward the direction and with the speed of said conveying means during the cutting operation.

6. The apparatus of claim 4 wherein said blade is vertical and moves in a plane sloping in relation to the direction of motion of said conveying means with such a speed that the asparagus stalk is cut substantially vertically.

References Cited

UNITED STATES PATENTS

| 1,872,889 | 8/1932 | Champlin et al. | 146—81 |
| 1,579,598 | 4/1926 | De Back | 146—81 |
| 2,565,727 | 8/1951 | Henderson. | |
| 3,088,264 | 5/1963 | Sallee | 146—130 X |
| 3,237,664 | 3/1966 | Macy et al. | 146—106 X |

FOREIGN PATENTS 712,368  10/1941  Germany.

W. GRAYDON ABERCROMBIE, *Primary Examiner.*

WILLIAM W. DYER, Jr., *Examiner.*